US012738514B2

(12) United States Patent
Hellmann et al.

(10) Patent No.: US 12,738,514 B2
(45) Date of Patent: Sep. 15, 2026

(54) METHOD FOR OPERATING A FUEL CELL SYSTEM, AND FUEL CELL SYSTEM

(71) Applicant: Robert Bosch GmbH, Stuttgart (DE)

(72) Inventors: Mark Hellmann, Korntal (DE); Matthias Rink, Herrenberg (DE)

(73) Assignee: Robert Bosch GmbH, Stuttgart (DE)

( * ) Notice: Subject to any disclaimer, the term of this patent is extended or adjusted under 35 U.S.C. 154(b) by 797 days.

(21) Appl. No.: 18/040,208

(22) PCT Filed: Jul. 19, 2021

(86) PCT No.: PCT/EP2021/070093
§ 371 (c)(1),
(2) Date: Feb. 1, 2023

(87) PCT Pub. No.: WO2022/028867
PCT Pub. Date: Feb. 10, 2022

(65) Prior Publication Data
US 2023/0299316 A1 Sep. 21, 2023

(30) Foreign Application Priority Data
Aug. 6, 2020 (DE) ..................... 10 2020 209 976.6

(51) Int. Cl.
*H01M 8/04119* (2016.01)
*H01M 8/04007* (2016.01)
(Continued)

(52) U.S. Cl.
CPC ... *H01M 8/04171* (2013.01); *H01M 8/04037* (2013.01); *H01M 8/04097* (2013.01); *H01M 8/04402* (2013.01); *H01M 8/04462* (2013.01)

(58) Field of Classification Search
CPC ......... H01M 8/04037; H01M 8/04171; H01M 8/04402; H01M 8/04462
See application file for complete search history.

(56) References Cited

FOREIGN PATENT DOCUMENTS

| | | |
|---|---|---|
| CN | 102318119 A | 1/2012 |
| CN | 206082071 U | 4/2017 |

(Continued)

OTHER PUBLICATIONS

DE102017210339A1 English machine translation (Year: 2025).*
(Continued)

*Primary Examiner* — Armindo Carvalho, Jr.
(74) *Attorney, Agent, or Firm* — Michael Best & Friedrich LLP

(57) ABSTRACT

The invention relates to a method for operating a fuel cell system in which at least one fuel cell (1) is supplied with hydrogen via an anode path (2) and with oxygen via a cathode path, and in which anode exhaust gas exiting the fuel cell (1) is recirculated via a recirculation path (3), wherein steam contained in the anode exhaust gas is adsorbed by means of a zeolite container (4). According to the invention, the following steps are carried out in order to regenerate the zeolite container (4): a) separating the zeolite container (4) from the recirculation path (3) by closing at least one shut-off valve (5, 6) and/or switching a directional control valve (7), b) heating the zeolite container (4) by means of an electric heating device (8) such that previously adsorbed water is desorbed, and c) removing the desorbed water from the system by switching the directional control valve (7) again and/or by opening at least one flushing valve (9, 10). The invention additionally relates to a fuel cell system which is suitable for carrying out the method.

8 Claims, 6 Drawing Sheets

(51) Int. Cl.

| | |
|---|---|
| ***H01M 8/04089*** | (2016.01) |
| ***H01M 8/0438*** | (2016.01) |
| ***H01M 8/0444*** | (2016.01) |

(56) References Cited

FOREIGN PATENT DOCUMENTS

| | | | | | |
|---|---|---|---|---|---|
| CN | 109786790 | A | | 5/2019 | |
| DE | 102008007024 | A1 | | 8/2009 | |
| DE | 102017210339 | A1 | | 12/2018 | |
| JP | 2007066529 | A | | 3/2007 | |
| JP | 2015064192 | A | | 4/2015 | |
| WO | WO-0178870 | A1 | * | 10/2001 | ............... B03C 1/00 |

OTHER PUBLICATIONS

JP-2015064192-A English machine translation (Year: 2026).*
CN-109786790-A English machine translation (Year: 2026).*
DE102017210339A English machine translation (Year: 2026).*
Translation of International Search Report for Application No. PCT/EP2021/070093 dated Nov. 3, 2021 (2 pages).

* cited by examiner

Pelectr.
4
6
13
3
9
8
14
15
T
p
M
1
2
5
12
11

A
B
C
D
E
XH2,act
XH2,max
160°
250°
TZ
tShut-off
8
5
6
10
t0
t1
t2
t3
t4 t5 t6 t8
t7 t9
t 16
7
4
13
3
9
P electr.
8
14
15
T
p
M
1
2
5
12
11

METHOD FOR OPERATING A FUEL CELL SYSTEM, AND FUEL CELL SYSTEM

BACKGROUND OF THE INVENTION

The invention relates to a method for operating a fuel cell system. In addition, the invention relates to a fuel cell system which is suitable for carrying out the method according to the invention or can be operated according to the method according to the invention.

A fuel cell converts hydrogen into electrical energy with the aid of oxygen. For this purpose, the fuel cell has a membrane electrode assembly with an anode and a cathode. Via an anode path, the anode is supplied with hydrogen, which is stored in a suitable tank. Via a cathode path, the cathode is supplied with ambient air, which serves as an oxygen supplier.

In order to increase performance, a plurality of fuel cells, e.g., 200 to 400 fuel cells, are generally installed in a stacked arrangement to form a fuel cell stack. This is traversed by several channels which serve for supplying the fuel cells with the gases required and for the discharge of the exhaust gases escaping from the fuel cells. Since the exhaust gas escaping on the anode side contains unused hydrogen, the anode exhaust gas is generally recirculated. The pressure loss in the anode path is thereby overcome, actively, by means of a fan and/or, passively, by means of a jet pump. Upstream of the anode inlet, fresh hydrogen from the tank is added to the recirculate.

Fuel cell systems with hydrogen-based fuel cells are considered to be the mobility concept of the future, since they essentially emit only water as exhaust gas and in addition make rapid refueling times possible. In order to discharge the water accumulating during operation, condensate separators are generally used, with whose aid liquid water is collected at defined points in the system and discharged to the environment at defined times via so-called drain valves. After a vehicle has been shut down, water additionally accumulates due to the system cooling and due to condensation of vaporous water of a gas phase. When the vehicle is started again, this water or condensate must also be removed in order to avoid blockages caused by accumulations of liquid water. At low outside temperatures, there is also the risk of the condensate freezing.

It has therefore already been proposed in the prior art that, after a fuel cell has been switched off, residual moisture be adsorbed by means of a zeolite-based adsorption unit and that the heat released during adsorption be used in the subsequent starting phase for heating the fuel cell. For example, reference is made here to the patent application DE 10 2008 007 024 A1.

The adsorption of water by means of a zeolite reservoir takes place exothermically, as a result of which the reservoir is heated to about 160° C. After this, the reservoir must be regenerated using a supply of heat (endothermic reaction), wherein the water previously taken up by adsorption is desorbed. For this purpose, a temperature level of 200° C. to 250° C. is typically required.

Proceeding from the aforementioned prior art, the object of the present invention is to optimize the regeneration of a zeolite-based water reservoir in a fuel cell system. In particular, regeneration is to be energy-optimized. Furthermore, the condensation of desorbed water is to be avoided, and—if possible—the operation of the fuel cell system is not to be impaired as a result.

SUMMARY OF THE INVENTION

In the proposed method for operating a fuel cell system, hydrogen is supplied to at least one fuel cell via an anode path, and oxygen is supplied via a cathode path. Anode exhaust gas emerging from the fuel cell is recirculated via a recirculation path, wherein water vapor contained in the anode exhaust gas is adsorbed by means of a zeolite reservoir. In order to regenerate the zeolite reservoir, the following steps are carried out:

a) separating the zeolite reservoir from the recirculation path by closing at least one shut-off valve and/or switching a directional control valve,
b) heating the zeolite reservoir by means of an electrical heating device, so that previously adsorbed water is desorbed, and
c) removing desorbed water from the system by switching the directional control valve again and/or by opening at least one flushing valve.

Due to the proposed separation of the zeolite reservoir from the recirculation path during the regeneration process, this process can be carried out largely independently of operation of the fuel cell system. This means that operation of the fuel cell system is not or is only slightly restricted by the regeneration process. Furthermore, desorbed water can be safely discharged without the risk of the anode being flooded or liquid water being released at the anode inlet. In addition, less hydrogen is trapped in the zeolite reservoir and discharged during the regeneration of the zeolite reservoir, so that less hydrogen is lost.

To carry out the proposed method, it is possible, for example, to use a zeolite reservoir which has a filling of zeolite material. Alternatively, the zeolite reservoir can also comprise a ceramic or metallic supporting structure which is coated with a zeolite material.

According to the prior art described above, the zeolite reservoir can be used in a fuel cell system with active and/or passive recirculation.

Advantageously, at least one shut-off valve upstream of the zeolite reservoir is provided for separating the zeolite reservoir from the recirculation path of the fuel cell system. By closing the shut-off valve, a flow of recirculate through the zeolite reservoir is prevented, and the additional volume created by the zeolite reservoir is separated off, so that the system behaves less sluggishly. In this way, the behavior of the system can be positively influenced at the same time.

A further shut-off valve or a directional control valve, in particular a 3/2 directional control valve, is preferably arranged downstream of the zeolite reservoir. With the aid of the further shut-off valve, but also with the aid of the directional control valve, a connection of the zeolite reservoir to the at least one flushing valve can be interrupted during desorption. To remove desorbed water from the zeolite reservoir, the shut-off valve and the at least one flushing valve can be opened so that desorbed water is discharged thereby. If a directional control valve is provided instead of a second shut-off valve, it can be switched in such a way that a flushing path for discharging the desorbed water is released.

According to a preferred embodiment of the invention, step a) is initiated only when a maximum hydrogen concentration and/or a maximum hydrogen partial pressure is not reached in the recirculation path. This is the case, for example, in the lower load range of the fuel cell system or shortly before a flushing operation of the system. In this way, hydrogen consumption can be further reduced or minimized. Furthermore, it is ensured that the amount of hydrogen trapped in the zeolite reservoir is diluted sufficiently before removal.

Furthermore, it is proposed that, in step b), the zeolite reservoir be heated to a temperature of about 250° C. in order to expedite the desorption of the previously adsorbed water or water vapor. Alternatively or additionally, it is proposed that at least one heating cartridge integrated into the zeolite reservoir be used as an electric heating device for heating the zeolite reservoir. The heating of the zeolite reservoir can be accelerated with the aid of the at least one integrated heating cartridge. The at least one heating cartridge can be arranged, for example, in a zeolite filling of the zeolite reservoir.

Because the zeolite reservoir was separated from the system before step b) was initiated, heat losses caused by convection and/or interaction with the remaining volume are prevented or kept low. The heating of the zeolite reservoir is also possible independently of system operation—in particular, independently of the pressure, the temperature, and/or the volume flow in the system.

When the temperature of about 250° C. is reached, the zeolite reservoir releases the previously adsorbed water as water vapor back into the volume of the zeolite reservoir. As a result, the pressure in the zeolite reservoir rises. The pressure in the zeolite reservoir can thus be used as a measured variable of the amount of water desorbed. The same applies analogously to the temperature in the zeolite reservoir. The pressure and/or the temperature in the zeolite reservoir are therefore preferably measured, and, from the measured values, the amount of water desorbed in the zeolite reservoir is deduced. When a prespecified maximum pressure and/or temperature limit is reached in the zeolite reservoir, heating of the zeolite reservoir can be terminated.

Before step c) is initiated, preferably a check is first made as to whether certain conditions—in particular, dilution conditions—are present for opening a flushing valve. This is because the discharge of water or water vapor from the system is generally tied to the conditions that hydrogen contained therein be sufficiently diluted (dilution constraint). Only when this condition is met can the at least one flushing valve be opened.

Furthermore, it is proposed that water desorbed in step c) be introduced into a cathode exhaust gas path or discharged to the environment via the directional control valve and/or the at least one flushing valve. Introduction into the cathode exhaust gas path can be effected, for example, via the flushing valve usually provided for flushing the recirculation path. If this is opened for flushing, operation of the fuel cell system will not be possible, or possible only to a limited extent.

In order not to restrict system operation during the removal of desorbed water from the zeolite reservoir, it is proposed in a development of the invention that a further flushing valve be provided for opening an additional flushing path. Desorbed water can then likewise be introduced into the cathode exhaust gas path or discharged to the environment via the additional flushing path. Opening the additional flushing path does not impair system operation. This means that the regeneration of the zeolite reservoir and the operation of the fuel cell system can proceed separately from one another, thus enabling more degrees of freedom in the operation of the fuel cell system.

Alternatively, the functions of the second shut-off valve and of the further flushing valve can be combined in the already proposed directional control valve arranged downstream of the zeolite reservoir. In this case, the additional flushing path can be released by corresponding switching of the directional control valve. For this purpose, the directional control valve is preferably designed as a 3/2-way control valve. Depending upon the switching position of the directional control valve, desorbed water from the zeolite reservoir is then introduced into the additional flushing path or routed to a flushing valve.

If no directional control valve, but instead a second shut-off valve is arranged downstream of the zeolite reservoir, it is proposed that at least one shut-off valve be opened in step c), so that desorbed water from the zeolite reservoir is routed to the at least one flushing valve. This means that at least the shut-off valve arranged downstream of the zeolite reservoir and also a flushing valve are opened for flushing. During flushing, both shut-off valves and a flushing valve can also be opened. However, this increases the risk of liquid water condensation at the anode inlet.

Preferably, steps a) through c) are repeated at least once, preferably several times, until the desired amount of water is expelled from the zeolite reservoir and/or the regeneration of the zeolite reservoir is completed. Since, with increasing regeneration of the zeolite reservoir, pressure during heating of the zeolite reservoir rises less than temperature, the characteristic behavior of pressure and temperature rise can be used for monitoring the regeneration process. Furthermore, the following criteria can be used, which indicate a completion of the regeneration of the zeolite reservoir:

- at a constant temperature, the pressure does not increase, or hardly at all, i.e., no more water passes into the gas phase in the volume of the zeolite reservoir;
- the temperature rises significantly or rapidly above the desorption temperature, i.e., the rate of change of the temperature increase dT/dt of the zeolite reservoir exceeds a certain threshold value, and less water is desorbed.

However, carrying out the method according to the invention is also possible without a pressure sensor for measuring the pressure in the volume of the zeolite reservoir. This is because, with known heating performance and with known thermal behavior of the zeolite reservoir, it is possible to estimate solely from the temperature gradient or curve how much water vapor is present in the zeolite reservoir at any given time and what its regeneration state is.

For complete regeneration, the zeolite reservoir is preferably repeatedly heated and desorbed water removed from the zeolite reservoir by flushing. With the flushing quantity, residual hydrogen is also flushed out, wherein the residual hydrogen content is highest during the first flushing. In the subsequent flushing operations, the residual hydrogen content continues to decrease, since, as a result of the closed shut-off valve upstream of the zeolite reservoir, no recirculate containing hydrogen flows into the zeolite reservoir.

Particularly during the first flushing, if the residual hydrogen content is particularly high, a combined flushing strategy can for this reason also be applied. For example, a first flushing valve opening into the cathode exhaust gas path and, if provided, a second flushing valve opening into an additional flushing path can be opened simultaneously.

Alternatively, it is proposed that, during the first flushing operation, a first flushing valve be opened and, on repeated flushing, a second flushing valve be opened. This means that first and second flushing valves are opened one after the other in successive flushing operations. The first flushing valve can, in particular, be a flushing valve opening into the cathode exhaust gas path, since the residual hydrogen content will still be very high during the first flushing operation. In the cathode exhaust gas path, the flushing quantity mixes with the air present there, so that there is adequate dilution of the residual hydrogen. In the at least one subsequent flushing operation, when the residual hydrogen content has already fallen, the flushing quantity can then be introduced into an additional flushing path via the second flushing valve. The introduction into an additional flushing path has the advantage that the subsequent flushing operation, unlike the first flushing operation, can be carried out independently of the operation of the fuel cell system. The operation of the fuel cell system is therefore not restricted.

In order to achieve the object mentioned at the outset, a fuel cell system with at least one fuel cell is proposed, which can be supplied with hydrogen via an anode path and with oxygen via a cathode path. The fuel cell system also comprises a recirculation path via which anode exhaust gas escaping from the fuel cell can be recirculated, and a zeolite reservoir by means of which water vapor contained in the anode exhaust gas can be adsorbed. According to the invention, the zeolite reservoir can be connected or disconnected via at least one shut-off valve and/or a directional control valve. By connecting the zeolite reservoir, water vapor contained in the recirculate can be adsorbed. By disconnecting or separating the zeolite reservoir from the recirculation path, the zeolite reservoir can be regenerated by desorption, and indeed independently of the operation of the fuel cell system. This means that the regeneration of the zeolite reservoir does not lead to a restriction of the system operation.

In the proposed fuel cell system, the zeolite reservoir is not connected in series, but in parallel. The parallel connection has, among other things, the advantage that the pressure loss in the anode path is kept low.

The parallel connection of the zeolite reservoir is effected by means of the valves mentioned, which enable a complete separation of the zeolite reservoir from the recirculation path. The valves comprise at least one shut-off valve, which is arranged upstream of the zeolite reservoir and, in the closed position, prevents recirculate from flowing through the zeolite reservoir. A further shut-off valve or a directional control valve, preferably a 3/2-way control valve, can be arranged downstream of the zeolite reservoir. If a further shut-off valve is provided, the water desorbed during the regeneration of the zeolite reservoir can be discharged via the usually provided flushing valve that opens into the cathode exhaust gas path. Alternatively or additionally, the desorbed water can also be introduced into an additional flushing path via a further flushing valve. If an additional flushing path is provided, the functions of the shut-off valve arranged downstream of the zeolite reservoir and of the further flushing valve can also be realized by means of the directional control valve.

The proposed fuel cell system is particularly suitable for carrying out the method according to the invention described above. The same advantages can thus be secured with the aid of the fuel cell system. Furthermore, the zeolite reservoir can be designed analogously to the previously described zeolite reservoir and/or be connected to the system.

In a development of the fuel cell system according to the invention, it is proposed that an electrical heating device be integrated into the zeolite reservoir, so that the zeolite reservoir can be heated for the desorption of water. By means of the electrical heating device, the zeolite reservoir can be brought rapidity to the temperature of about 250° C. that is required for desorption. In the case of adsorption, in particular during a cold start, the zeolite reservoir can also be preheated with the aid of the electrical heating device.

In a particularly preferred embodiment, the electrical heating device comprises at least one heating cartridge. This can be easily integrated into a filling of the zeolite reservoir consisting of zeolite material.

Furthermore, it is proposed that the zeolite reservoir be connected via the directional control valve and/or at least one flushing valve to a cathode exhaust gas path and/or to the environment, so that desorbed water from the zeolite reservoir can be introduced into the cathode exhaust gas path or be discharged to the environment. The latter is possible, since the residual hydrogen content—in particular after a first flushing operation—is generally very low. During the first flushing, the flushing quantity is preferably introduced into the cathode exhaust gas path in order to dilute the residual hydrogen contained therein with the air present there.

BRIEF DESCRIPTION OF THE DRAWINGS

The invention and its advantages are explained in more detail below with reference to the accompanying drawings. In the drawings.

DETAILED DESCRIPTION

Figure 1:
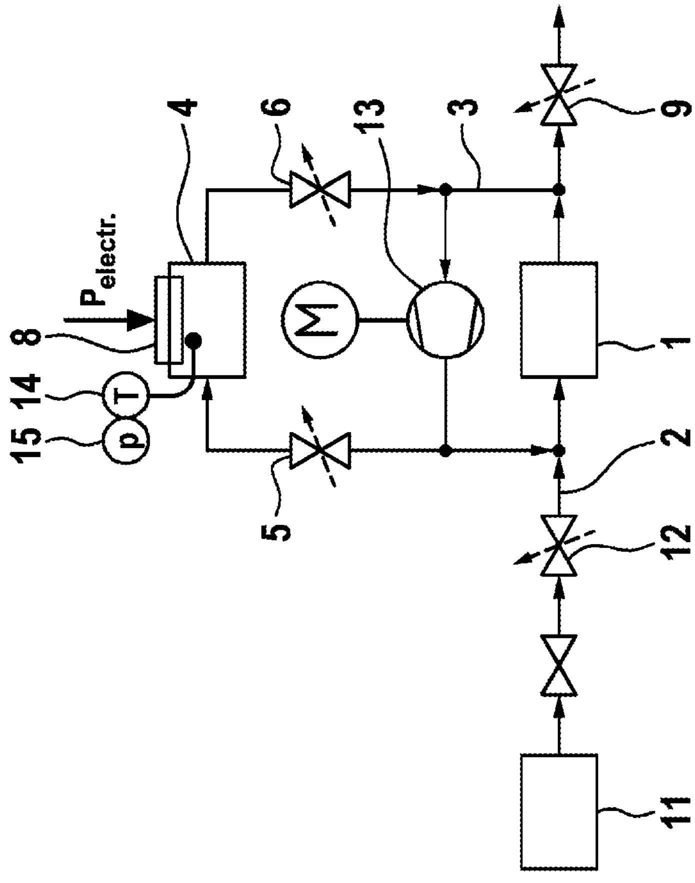
FIG. 1 is a schematic view of a first fuel cell system according to the invention for carrying out the method according to the invention.

The fuel cell system shown in FIG. 1 comprises at least one fuel cell 1 which, on the anode side, can be supplied with an anode gas via an anode path 2, specifically with hydrogen from a tank 11. The supply of fresh hydrogen can be controlled via a valve 12. Since the anode exhaust gas escaping from the fuel cell 1 still contains a residue of hydrogen, it is recirculated via a recirculation path 3 or fed back into the anode path 2. In the present case, the recirculation is actively assisted by means of a recirculation fan 13. In the anode path 2, fresh hydrogen from the tank 11 is added to the recirculate.

Since the recirculated anode exhaust gas, in addition to hydrogen, also contains water, namely liquid and gaseous water or water vapor, the fuel cell system shown in FIG. 1 also has a zeolite reservoir 4 for dehumidifying the recirculate. The zeolite reservoir 4 is connected to or connected in parallel to the recirculation path 3 via a first shut-off valve 5 and a second shut-off valve 6. In the open position of the shut-off valves 5, 6, recirculate flows through the zeolite reservoir 4, wherein the water contained therein is removed by means of adsorption. In this case, heat is produced, which can be used, for example, during a cold start of the system in order to bring the system up to operating temperature more quickly. In addition, the zeolite reservoir 4 can be heated by means of an integrated electrical heating device 8. This is advantageous in particular during a start under freezing conditions.

Since the anode gas can further accumulate nitrogen during operation of the fuel cell system, which, for example, diffuses from the cathode side (not shown) to the anode side, the anode path 2 and the recirculation path 3 must be flushed from time to time. For this purpose, a flushing valve 9 is provided on the outlet side, which preferably opens into a cathode exhaust gas path (not shown). The flushing quantity discharged via the flushing valve 9 is then replaced by fresh hydrogen from the tank 11.

The flushing valve 9 shown in FIG. 1 is also used in the present case for the regeneration of the zeolite reservoir 4. First, the zeolite reservoir 4 is separated from the recirculation path 3 and then brought to a temperature of about 250° C. by means of the electric heating device 8, so that previously adsorbed water is desorbed. The desorbed amount of water can then be introduced into the cathode exhaust gas path by opening the shut-off valve 6 and the flushing valve 9. As a rule, the heating and flushing of the zeolite reservoir 4 is repeated several times until the desorbed amount has been completely removed from the zeolite reservoir 4. If this is the case, the temperature and/or the pressure in the zeolite container 4 can be monitored. For this purpose, a temperature sensor 14 and a pressure sensor 15 are in each case provided in the zeolite reservoir 4.

The exact sequence of the adsorption and desorption phases of the zeolite reservoir 4 shown is explained below with reference to the diagram in FIG. 2.

Times t0 to t9 are plotted on the timeline. At time to, the system requires water or water vapor to be removed from the recirculated anode exhaust gas and, if necessary, heat to be introduced, for example during a start under freezing conditions. The two shut-off valves 5, 6 are opened so that recirculated anode exhaust gas flows through the zeolite reservoir 4. At time t1, exothermic adsorption begins, wherein the zeolite reservoir 4 is heated until time t2 to about 160° C. Depending upon the requirement regarding dynamics and/or initial temperature, two operating modes can be differentiated:

1. without supply of electrical energy $P_{electr.}$ (solid line Tz), so that the zeolite reservoir 4 is heated solely via exothermic adsorption, and
2. with initial supply of electrical energy $P_{electr.}$ (dashed line Tz), so that the zeolite reservoir 4 is heated by exothermic adsorption and by the electrical energy $P_{electr.}$ supplied from the outside.

In principle, the kinetics of the adsorption process are sufficient to heat the zeolite reservoir 4, so that variant 1 can be followed. At particularly low outside temperatures, e.g., at −40° C., when the kinetics are very slow and the requirements of the system regarding the dynamic behavior of the zeolite reservoir 4 are otherwise not met, variant 2 proves advantageous.

At time t2, the system-side requirement to store water in the zeolite reservoir 4 is withdrawn, since, for example, no more water can be stored, or there is no longer any such requirement. Since the shut-off valves 5, 6 are still open, the flow through the zeolite reservoir 4 continues. This is because a suitable point in time is awaited for closing the shut-off valves 5, 6. This is arrived at, for example, when a maximum hydrogen concentration $X_{H2,max}$ in the zeolite reservoir 4 is not reached. In this way, hydrogen losses during the subsequent regeneration of the zeolite reservoir 4 can be kept low. After the closing of the two shut-off valves 5, 6 at time $t_{shut-off}$, the gas composition in the zeolite reservoir 4 initially no longer changes.

At time t3, the zeolite reservoir 4 is to be regenerated. For this purpose, the zeolite material is heated to about 250° C. by means of the electrical heating device 8 in order to desorb water from the zeolite reservoir 4. Since both shut-off valves 5, 6 are closed, heat losses are kept at a minimum. The heating of the zeolite reservoir 4 is also possible independently of the system.

At time t4, the desorption temperature of 250° C. is reached, and the zeolite reservoir 4 releases the previously adsorbed water again to the volume of the zeolite reservoir 4 as water vapor. The result of this is that the pressure in the zeolite reservoir 4 rises, which can be used as a measured variable for the desorbed water quantity.

At time t5, a maximum pressure and/or a maximum temperature in the zeolite reservoir 4 is or are exceeded, so that the electrical heating device 8 is switched off. Furthermore, a query is made to the system as to whether the required dilution conditions (dilution constraint) are present for flushing the system. If there is a positive response, the shut-off valve 6 and the flushing valve 9 are opened, and the hydrogen/water vapor mixture is flushed out of the zeolite reservoir 4. In this phase, operation of the fuel cell system is not possible, or possible only to a limited extent.

After a first flushing operation, the shut-off valve 6 is closed again at time t6, and the processes of heating the zeolite reservoir 4 and flushing are repeated until the desired amount of water is expelled from the zeolite reservoir 4, and the regeneration of the zeolite reservoir 4 is completed. The characteristic behavior of the temperature rise and pressure rise in the zeolite reservoir 4 during the heating phase from t3 to t4 or from t6 to t7, etc., can be used as a termination criterion. This is because, with increasing regeneration of the zeolite reservoir 4, the pressure increases less strongly in comparison with the temperature.

Figure 2:
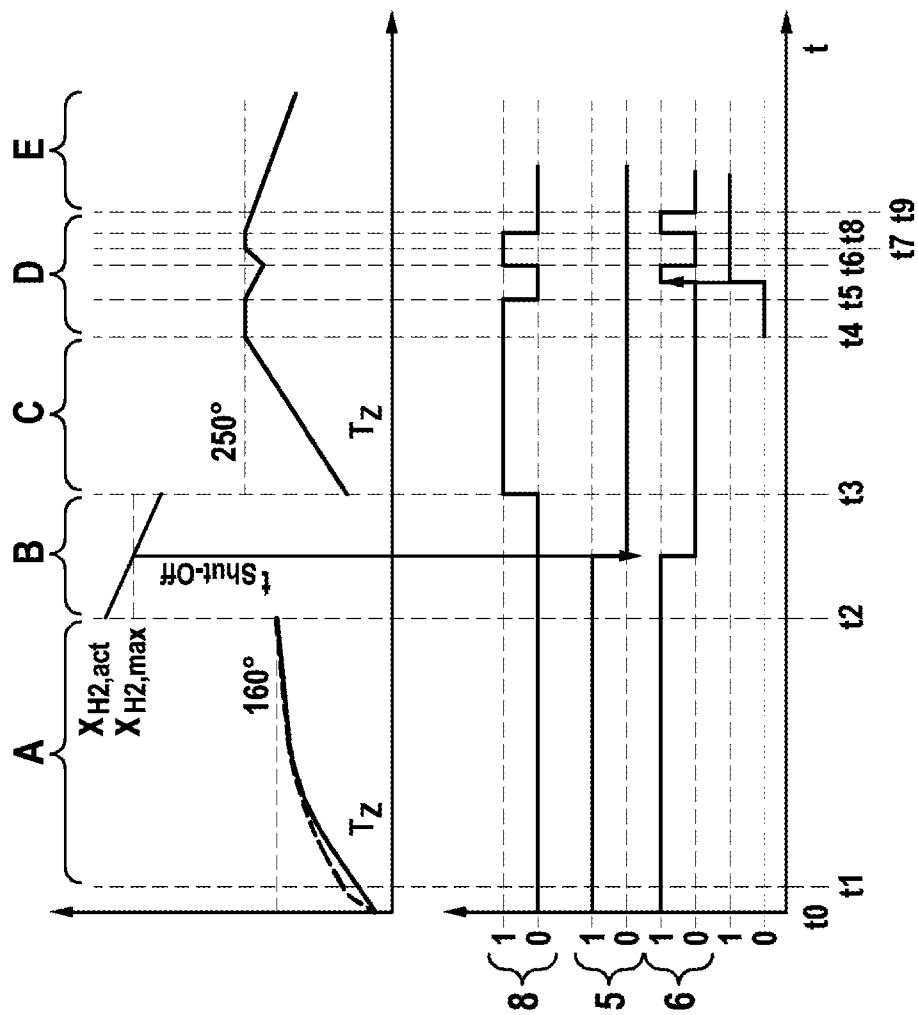
FIG. 2 shows the implementation of the method according to the invention with the aid of the fuel cell system of FIG. 1.

The successive phases are denoted in FIG. 2 by A for adsorption phase, B for valve closing phase, C for heating phase, and D for desorption phase. This can be followed by phase E of shutdown, or further operation of the system.

Figure 3:
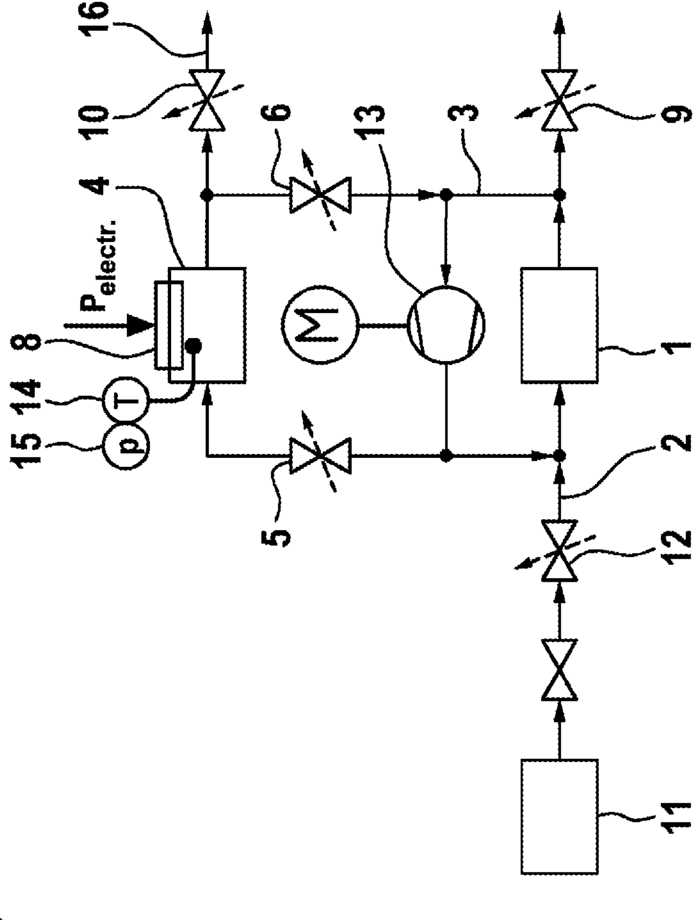
FIG. 3 is a schematic view of a second fuel cell system according to the invention for carrying out the method according to the invention.

FIG. 3 shows a modification of the system of FIG. 1. The modification consists of a further flushing valve 10 being provided, which opens into an additional flushing path 16. The further flushing valve 10 can be opened for the regeneration of the zeolite reservoir 4 independently of the first flushing valve 9, and thus independently of the operation of the fuel cell system. The further flushing valve 10 thus enables more degrees of freedom during operation of the fuel cell system.

Figure 4:
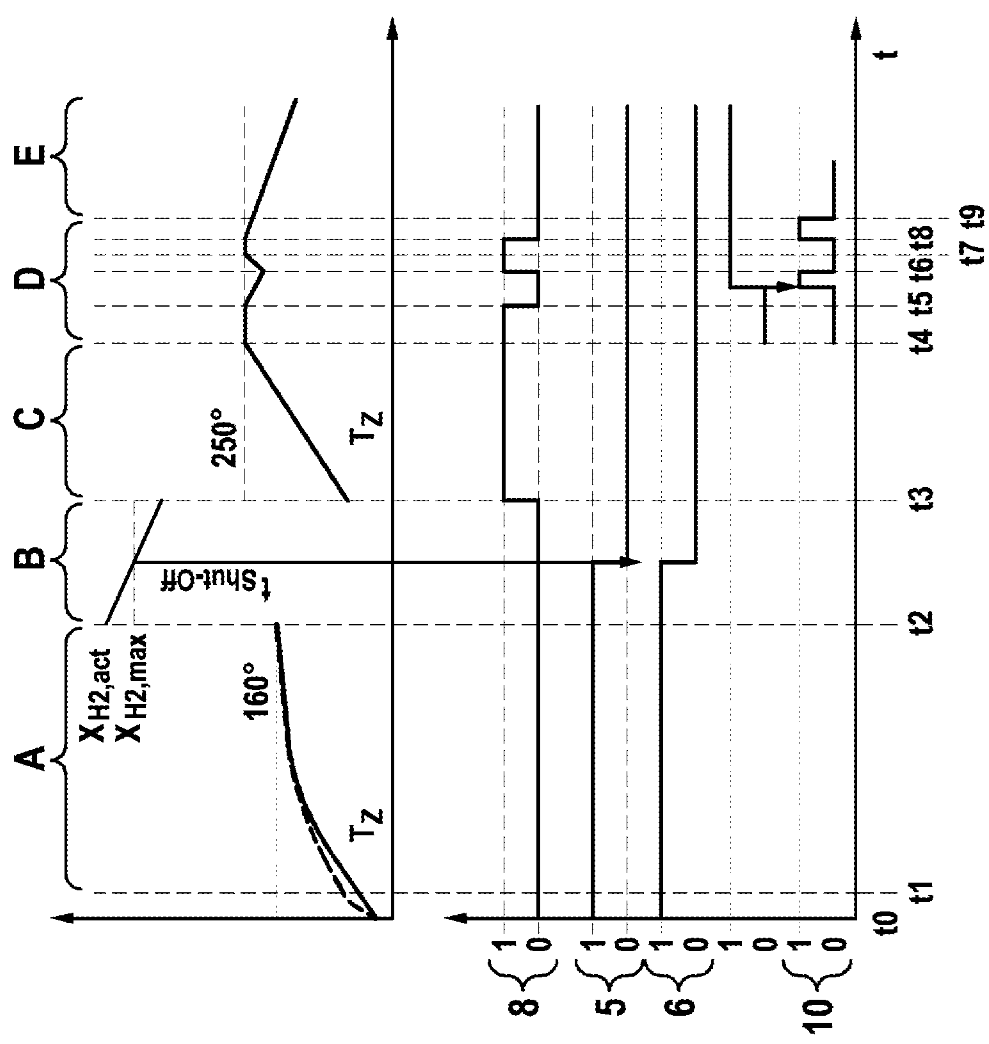
FIG. 4 shows the implementation of the method according to the invention with the aid of the fuel cell system of FIG. 3.

The sequences during operation of the fuel cell system of FIG. 3 are shown in FIG. 4. The adsorption phase A, the valve closing phase B, and the heating phase C run analogously to the corresponding phases in FIG. 2, so that reference is made to the description of FIG. 2. Differences exist only with regard to the desorption phase D. The discharge of the hydrogen/water vapor gas mixture takes place here via the further flushing valve 10 into the additional flushing path 16. Here, too, certain dilution conditions must be observed, but these can differ from those mentioned above. Depending upon the design of the zeolite reservoir 4 and the choice of $X_{H2,max}$, it is even possible to discharge the gas mixture directly to the environment.

Figure 5:
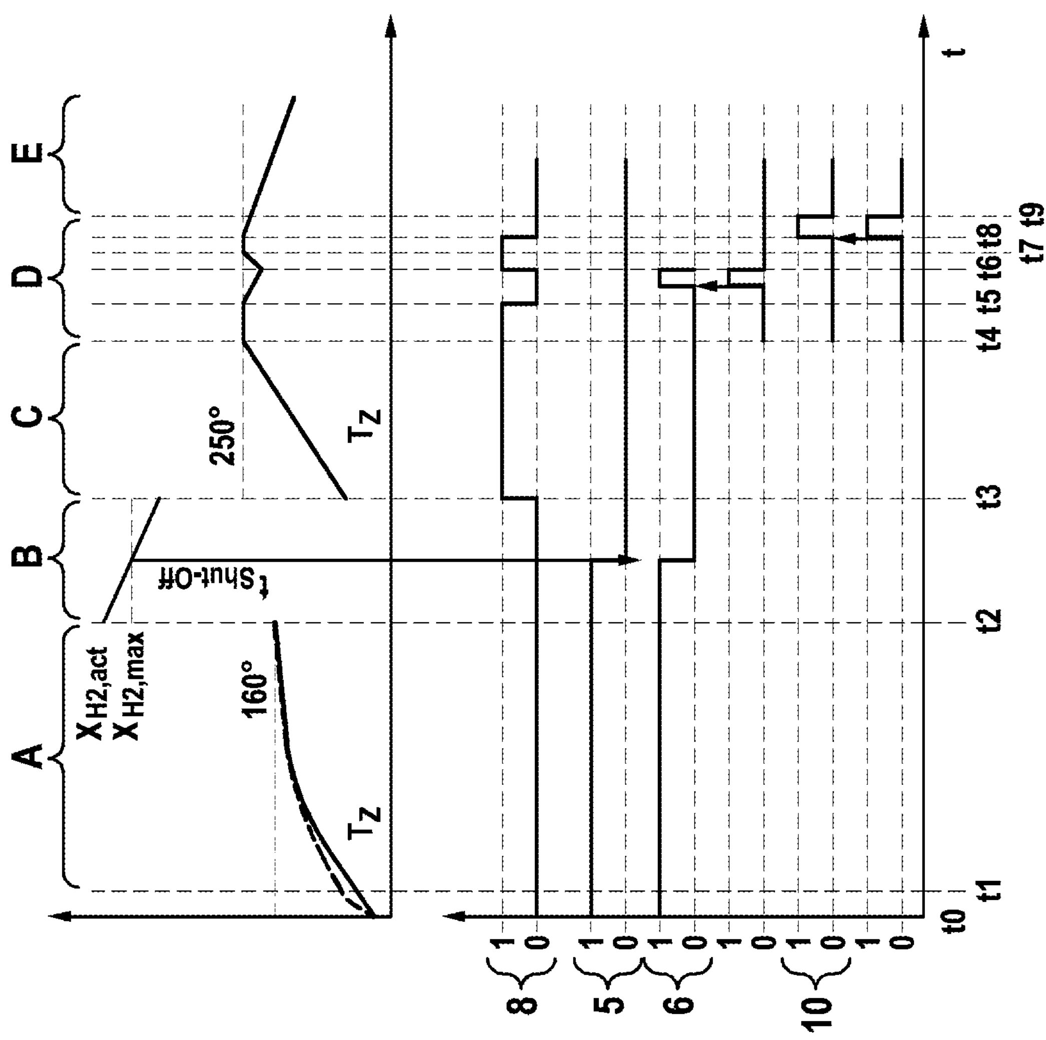
FIG. 5 shows an alternative implementation of the method according to the invention with the aid of the fuel cell system of FIG. 3.

Alternatively, a combined flushing strategy can also be applied with the aid of the system of FIG. 3. This is shown by way of example in FIG. 5. Here, both flushing valves 9, 10 are opened in the desorption phase D, and indeed with a time offset. At high hydrogen concentrations in the zeolite reservoir 4, flushing is initially carried out via first flushing valve 9—at least during the first flushing operation. In the second and in each further flushing operation (with a low to negligible hydrogen concentration), flushing takes place via the further flushing valve 10. This strategy is optimal for ensuring the required dilution of the residual hydrogen. This is because, with the opening of the first flushing valve 9 and introduction of the flushing quantity into the cathode exhaust gas path (not shown), the flushing quantity mixes with the air present there. However, normal operation of the fuel cell system is interrupted or disturbed. It is therefore advantageous if, in the further course of regeneration of the zeolite reservoir 4, the flushing quantity is discharged via the further flushing valve 10 and the flushing path 16. This is because this process does not affect the operation of the fuel cell system.

Figure 6:
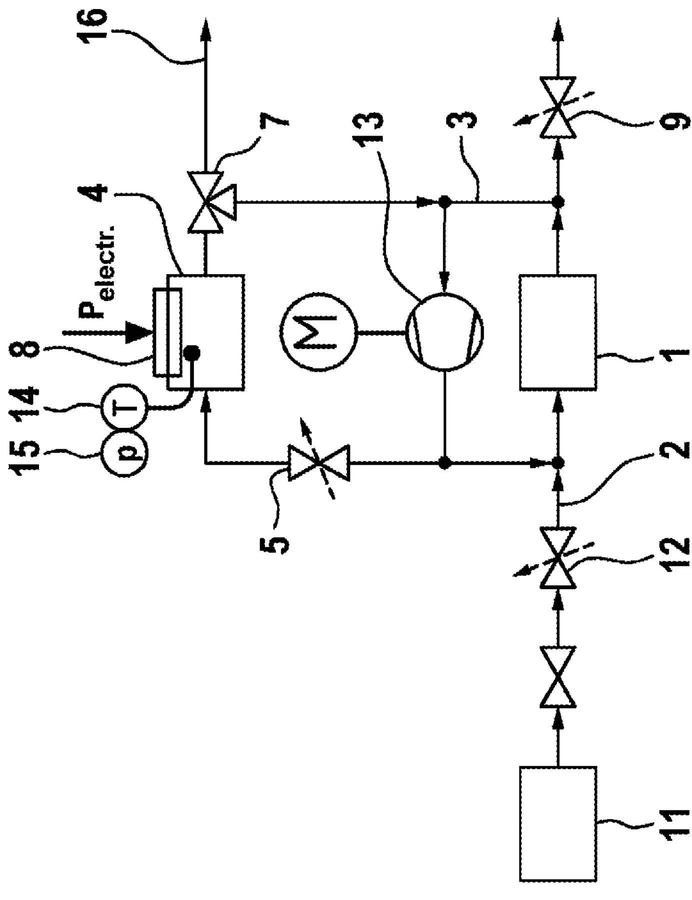
FIG. 6 is a schematic view of a third fuel cell system according to the invention for carrying out the method according to the invention.

A further modification of the fuel cell system according to the invention is shown in FIG. 6. Here, the functions of the shut-off valve 6 and of the further flushing valve 10 are realized by a 3/2-way control valve 7. The construction of the fuel cell system can thereby be simplified, since a valve is conserved.

The invention claimed is:

1. A method for operating a fuel cell system, in which a fuel cell (1) is supplied with hydrogen via an anode path (2) and oxygen via a cathode path, and in which anode exhaust gas escaping from the fuel cell (1) is recirculated via a recirculation path (3), wherein water vapor contained in the anode exhaust gas is adsorbed by means of a zeolite reservoir (4), wherein, for regeneration of the zeolite reservoir (4), the following steps are carried out:

a) separating the zeolite reservoir (4) from the recirculation path (3) by closing a shut-off valve (5, 6), by switching a directional control valve (7), or both, b) heating the zeolite reservoir (4) by means of an electrical heating device (8), so that previously adsorbed water is desorbed, and c) removing desorbed water from the system by switching the directional control valve (7) again, by opening a flushing valve (9, 10), or both, wherein step a) is initiated when a maximum hydrogen concentration ($X_{H2,max}$) is not reached in the recirculation path (3), a maximum hydrogen partial pressure ($p_{H2}$) is not reached in the recirculation path (3), or both.

2. The method according to claim 1, wherein, in step b), the zeolite reservoir (4) is heated to a temperature of about 250° C., a heating cartridge integrated into the zeolite reservoir (4) is used as an electrical heating device (8) for heating the zeolite reservoir (4), or both.

3. The method according to claim 1, wherein a pressure and/or a temperature in the zeolite reservoir (4) are measured, and, from the measured values, an amount of water desorbed in the zeolite reservoir (4) is deduced.

4. The method according to claim 1, wherein the heating of the zeolite reservoir (4) is ended when a prespecified maximum pressure and/or temperature limit value is reached in the zeolite reservoir (4).

5. The method according to claim 1, wherein, before step c) is initiated, a check is made as to whether dilution conditions are present for opening a flushing valve (9, 10).

6. The method according to claim 1, wherein, in step c), desorbed water is introduced into a cathode exhaust gas path or discharged to an environment via the directional control valve (7) and/or the flushing valve (9, 10).

7. The method according to claim 1, wherein, in step c), the shut-off valve (5, 6) is opened so that desorbed water from the zeolite reservoir (4) is routed to the flushing valve (9, 10).

8. The method according to claim 1, wherein steps a) through c) are repeated, wherein a first flushing valve (9) is opened during a first flushing, and a second flushing valve (10) is opened during repeated flushing.

* * * * *